United States Patent [19]

Truong-Cao

[11] 4,359,109

[45] Nov. 16, 1982

[54] IMPACTOR DRILL TOOL

[75] Inventor: Hung-Viet Truong-Cao, Corsicana, Tex.

[73] Assignee: Hughes Tool Company, Houston, Tex.

[21] Appl. No.: 170,267

[22] Filed: Jul. 21, 1980

[51] Int. Cl.$^{3}$ .......................... B23B 45/16; E21C 1/08

[52] U.S. Cl. .......................................... 173/111; 74/128

[58] Field of Search ....................... 173/93.7, 110, 111, 173/121; 74/128

[56] References Cited

U.S. PATENT DOCUMENTS

| | | | |
|---|---|---|---|
| 1,932,259 | 10/1933 | Warren | 173/111 X |
| 2,094,185 | 9/1937 | Norling | 173/121 |
| 3,231,028 | 1/1966 | Alcock et al. | 173/76 X |
| 3,268,014 | 8/1966 | Drew | 173/97 |
| 3,323,601 | 6/1967 | Vebel | 173/111 X |
| 3,463,246 | 8/1969 | Bronnert | 173/110 X |
| 3,478,829 | 11/1969 | Bixby | 173/104 |

FOREIGN PATENT DOCUMENTS

| | | | |
|---|---|---|---|
| 850281 | 9/1952 | Fed. Rep. of Germany | 173/111 |
| 376734 | 11/1939 | Italy | 173/111 |

*Primary Examiner*—Wm. Carter Reynolds
*Attorney, Agent, or Firm*—Robert A. Felsman; James E. Bradley

[57] ABSTRACT

A rock drill apparatus has features that allow it to be attached to a conventional impact tool. The rock drill attachment has a housing that is secured to the impact tool carriage below the hammer of the impact tool. A tappet is carried in the housing of the rock drill attachment for axial movement in response to blows from the hammer. The tappet is nonrotatable with respect to the housing and is adapted to deliver blows to a tool shank. A conversion device is coupled between the tappet and the tool shank to convert downward movement of the tappet into rotation of the tool shank prior to the impact of the tappet on the tool shank. A spring moves the tappet away from the tool shank after impact for repeating the cycle. The conversion device includes a sleeve with inclined splines that engage inclined splines on the tool shank. A clutch locks the sleeve to the tappet during downward movement to rotate the tool shank. During upward movement, the clutch allows the sleeve to rotate with respect to the tappet.

3 Claims, 3 Drawing Figures

IMPACTOR DRILL TOOL

BACKGROUND OF THE INVENTION

1. Field of the Invention

This invention relates in general to demolition tools, and in particular to a rock drill attachment for an impact tool.

2. Description of the Prior Art

One type of impact tool for breaking up hard formations in mining and construction industries is shown in U.S. Pat. No. 4,103,747 issued to Finney. This tool has a reciprocating hammer that delivers blows against a working tool, such as a chisel.

In certain operations, large boulders must be dynamited into smaller pieces before the impact tool can be used to break them down to a desired size. Dynamite operations require drilling holes in rock to a depth of three feet or less. It would be an advantage to use an impact tool as a rock drill for drilling these holes, as well as using the impact tool for demolition.

Rock drills that use rotary motion and impact from a hammer or piston are known, such as those shown in the following U.S. Pat. Nos.: 3,231,028 issued to Alcock et al; 3,268,014 issued to Drew; 3,478,829 issued to Bixby; 3,685,593 issued to Amtsberg et al and 3,981,368 issued to Lundstrom et al. In some of the patents, such as in the Bixby patent, rotation can be stopped for pure impact operations. Some, such as the device shown in the Alcock et al patent, use the reciprocating motion of the hammer to compress air for delivery to the drill bit. In all of these patents the working tool is driven by a rotary mechanism that is separate from the reciprocating action of the hammer. None of these patents show a rock drill attachment for securing to an impact tool in place of the chisel. None of these show a device that directly converts the reciprocating motion of the hammer to rotation.

SUMMARY OF THE INVENTION

It is accordingly a general object of this invention to provide an improved rock drill attachment for an impact tool.

It is a further object of this invention to provide an improved rock drill attachment for an impact tool that directly converts downward movement of the hammer into rotation.

In accordance with these objects, a rock drilling attachment is provided that has a housing that fits directly into the carriage of the impact tool, replacing the working tool or chisel. The housing carries a reciprocating tappet which is mounted for receiving blows from the hammer. The tappet is nonrotatable with respect to the housing and is in alignment with a tool shank for transmitting blows received from the hammer to the tool shank. The tool shank has a lower end that receives a drill bit. A conversion means converts the movement of the tappet toward the tool shank into rotation of the tool shank. A spring means moves the tappet away from the tool shank after impact to repeat the cycle. The conversion means allows the tool shank to remain stationary as the tappet is being withdrawn.

In the preferred embodiment, the conversion means comprises a sleeve coupled between the tappet and the tool shank that has helical splines for rotating the tool shank as the sleeve is moved downward. A clutch mechanism, coupled between the sleeve and the tappet, locks the sleeve to the tappet for downward movement, but allows the sleeve to rotate during upward movement.

DESCRIPTION OF THE PREFERRED EMBODIMENT

Figure 1:
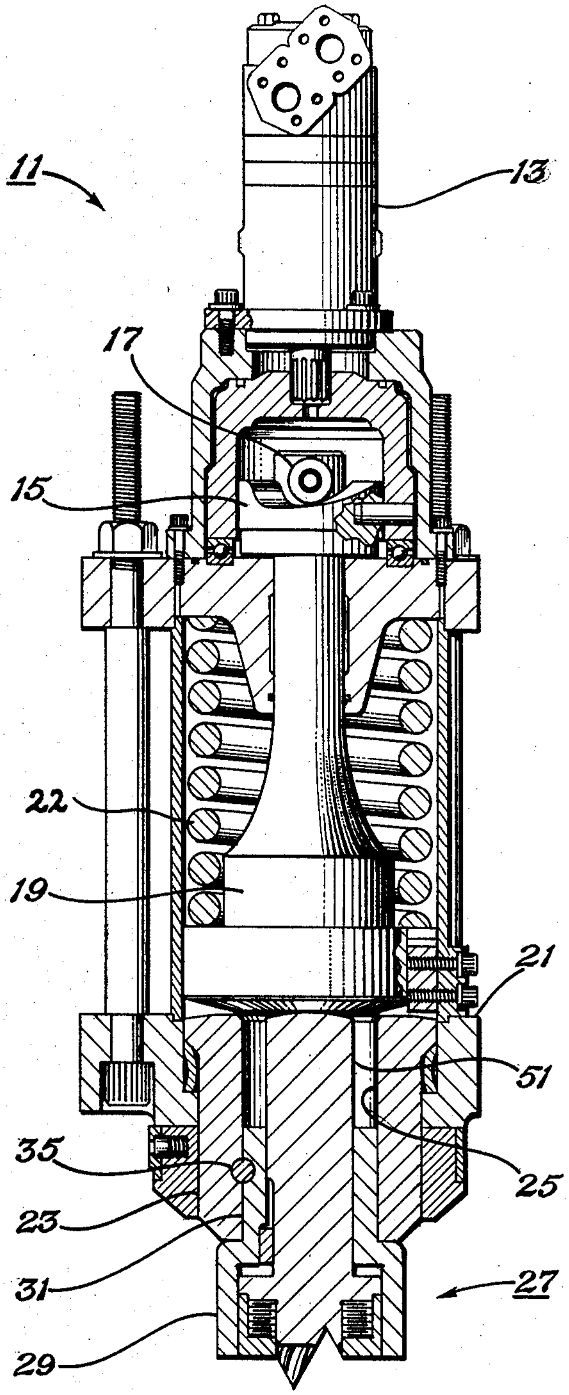
FIG. 1 is a side view, partially sectioned, of an impact tool, showing portions of a rock drill attachment constructed in accordance with this invention.

FIG. 1 shows an impact tool 11 of the type for which the rock drill attachment of this invention is adapted to be mounted. The impact tool 11 is discussed in more detail in U.S. Pat. No. 4,103,747 issued to Finney. The general features of the impact tool 11 include a hydraulic motor 13 that rotates a cam 15. Cam followers 17 alternately raise and release a hammer 19. Hammer 19 is carried along the axis of a carriage 21 and is urged downwardly by a helical spring 22. Carriage 21 includes a tool guide 23 that has an axial passage 25 for carrying a working tool (not shown) such as a chisel.

Figure 2:
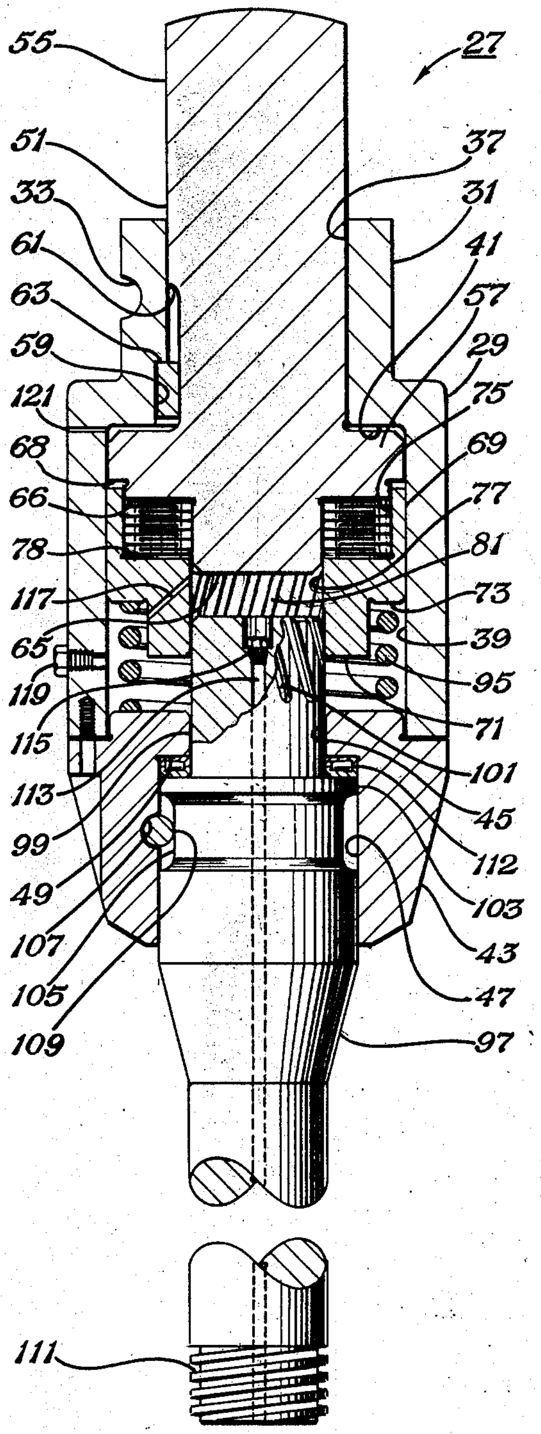
FIG. 2 is a side view, partially sectioned, of the rock drill attachment of FIG. 1.

Referring also to FIG. 2, rock drill attachment 27 has a housing 29 with a cylindrical neck 31 that is closely received within the axial passage 25. A transverse recess 33 is formed in the exterior sidewall of neck 31 for receiving a pin 35 to retain the rock drill attachment 27 with the tool guide 23.

Referring to FIG. 2, housing 29 has a cylindrical upper bore 37 and a lower cylindrical bore 39 of larger diameter and separated from upper bore 37 by a downwardly facing shoulder 41. A lower housing 43 is secured to the bottom of the housing 29. The words "upper" and "lower" are used herein for clarity although the tool would not always be used in a truly vertical orientation. Lower housing 43 has an upper bore 45 and a lower bore 47 of larger diameter and separated from upper bore 45 by downwardly facing shoulder 49.

Figure 3:
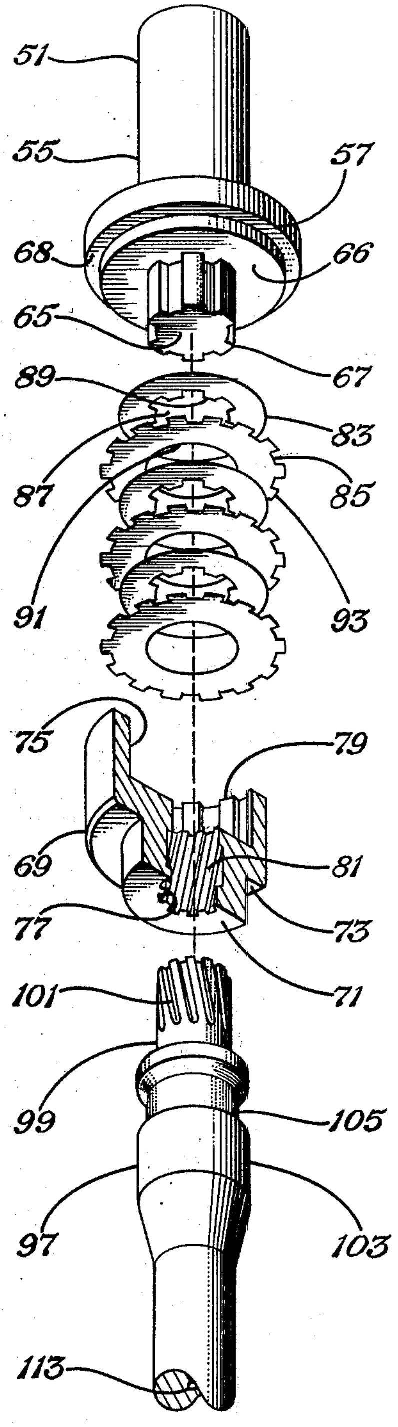
FIG. 3 is an exploded perspective view of portions of the rock drill attachment of FIG. 1.

Referring also to FIG. 3, a tappet 51 is reciprocally carried in the housing 29, with the word "reciprocally" being used herein to refer to vertical movement along the axis of housing 29 and carriage 21 (FIG. 1). Tappet 51 is a cylindrical member with an upper end 55 that protrudes above the housing neck 31 and is adapted to be struck by the hammer 19 (FIG. 1). The upper end 55 is slidably received within the housing upper bore 37. The upper bore 37 has a recess 59 formed on one side that mates with a recess 61 formed in the sidewall of tappet upper end 55. Recess 61 extends about twice as far as recess 59 along the axis of the rock drill attachment 27. A key is adapted to fit within the cavity defined by recesses 59 and 61. Recesses 59 and 61 and key 63 serve as means to prevent rotation of tappet 51 with respect to housing 29. The longer recess 61 allows axial reciprocal movement of tappet 51 with respect to housing 29.

Tappet 51 has a cylindrical intermediate portion 57 slidably received within the housing lower bore 39. Tappet 51 also has a depending lower end that extends below the intermediate portion 57. Lower end 65 is smaller in diameter than intermediate portion 57 defining a downwardly facing annular shoulder 66. Lower end 65 contains a plurality of equally spaced vertical splines 67 around its sidewall, shown in FIG. 3. Shoulder 66 has an annular recess 68 extending around its periphery.

A converter sleeve 69 is reciprocally carried in the lower bore 39 of housing 29. Sleeve 69 has a downwardly extending neck 71 that is cylindrical and of lesser diameter than bore 39, defining a downwardly facing shoulder 73. Sleeve 69 has an upper bore 75 and a reduced diameter lower bore 77, defining an upwardly facing shoulder 78. Referring to FIG. 3, the upper bore 75 has a plurality of equally spaced vertical splines 79. The lower bore 77 has a plurality of helically inclined splines 81 formed therein. Each spline 81 curves and inclines at an average angle of about 20° with respect to the axis of housing 29. The upper edge of a sleeve 69 extends partially into recess 68.

A plurality of flat, metal clutch disks are located between shoulders 66 and 78. Referring to FIG. 2, the clutch disks include several tappet disks 83, each sandwiched between two sleeve disks 85. The tappet disks 83 have a circular periphery of lesser diameter than the upper bore 75 of sleeve 69. Each disk 83 has an axial aperture 87 that contains a plurality of tabs 89. Tabs 89 are equally spaced so as to be received within the slots between the splines 67 of the tappet lower end 65. Splines 67 and tabs 89 prevent rotation of the tappet disks 83 with respect to the tappet 51. Sleeve disks 85 have axial circular apertures 91 that are larger in diameter than the diameter defined by the splines 67 of the tappet 51. A plurality of tabs 93 extend around the circular periphery of the sleeve disks 85. Tabs 93 are equally spaced so as to be received within the slots between the splines 79 of the sleeve 69. Tabs 93 and splines 79 prevent rotation of the sleeve disks 85 with respect to the sleeve 69.

As shown in FIG. 1, all of the disks 83 and 85 are adapted to be carried within the upper bore 75 of the sleeve 69 and around the lower end 65 of the tappet 51. When sufficient pressure is applied between the shoulders 66 and 78, friction between the upper and lower surfaces of the disks 83 and 85 prevents the sleeve 69 from rotating with respect to the tappet 51. When pressure is released sufficiently, the sleeve disks 85 are allowed to slip and rotate with respect to the tappet disks 83, allowing the sleeve 69 to rotate with respect to the tappet 51.

A helical spring 95 is compressed between the shoulder 73 of the sleeve 69 and the upper surface of the lower housing 43. Spring 95 serves as spring means for urging the sleeve 69 and tappet 51 upward, and causes sleeve 69 to reciprocate in unison with tappet 51.

A tool shank 97 is reciprocally carried in the housing 29. Tool shank 97 has an upper end 99 containing a plurality of inclined helical splines 101. Inclined splines 101 engage the inclined splines 81 of the converter sleeve 69. The tool shank upper end 99 moves axially in the upper bore 45 of the lower housing 43. Tool shank 97 has an intermediate portion 103 that moves axially in the lower bore 47 of the lower housing 43. An annular recess 105 is formed in the tool shank intermediate portion 103. A mating smaller recess 107 is formed in the lower bore 47, defining a cavity. The cavity receives a pin 109 for retaining the tool shank 97 to the lower housing 43. Recess 105 has a longer axial length than the cross sectional diameter of pin 109 to allow the tool shank to move axially a selected distance. Recess 107 is of the same cross sectional diameter as pin 109 to prevent movement of pin 109. An annular thrust bearing 112 is located between lower housing shoulder 49 and tool shank 97 for reducing friction during rotation.

Tool shank 97 has a threaded lower end 111 for receiving a cutting implement such as a drill bit (not shown). The bit is preferably a solid head bit with tungsten carbide inserts, such as shown in U.S. Pat. No. Re. 29,300 issued to Bender, but having a threaded stem for securing to the tool shank 97. An axial passage 113 extends through the tool shank 97. A check valve 115 is located in the top of passage 113 for allowing compressed air to pass in a downward direction only.

Air is compressed in the housing 29 by the tappet intermediate portion 57, which acts as a piston. A communication passage 117 extends through the converter sleeve 69 for admitting air from the portions surrounding the sleeve neck 71 to the lower bore 77. A check valve 119 is located in a passage extending from the interior of housing 29 below sleeve 69 to the exterior for admitting air. Check valve 119 prevents the outward flow of air to the exterior. A passage 121 through the wall of housing 29 above the tappet intermediate portion 57 allows the passage of air during stroking of the tappet 51.

To convert the impact tool 11 to drilling mode, referring to FIG. 1, pin 35 is removed and the working tool (not shown) is removed from the tool guide 23. Then the rock drill attachment 27 is inserted into the passage 25 of the tool guide 23. Pin 35 is placed in recess 33 to rigidly secure the housing 29 to the impact tool carriage 21.

In operation, referring to FIG. 1, a preload force is applied to carriage 21, this force being transmitted through housing 29, lower housing shoulder 49 to tool shank 97 and the bit. Hydraulic motor 13 continuously rotates cam 15 causing the cam followers 17 to move the hammer 19 upward, compressing spring 22. At the top of the stroke, referring to FIG. 2, spring 95 will have pushed tappet 51 to its uppermost position, wherein intermediate portion 57 contacts the housing shoulder 41. Hammer 19 will be above the top of tappet 51 a selected distance. At the top of the stroke, the lower ends of the converter sleeve inclined splines 81 will be in engagement with the upper ends of the tool shank splines 101.

Continued rotation of the hydraulic motor 13 causes the cam followers 17 to drop from the higher surface of the cam, allowing the spring 22 to drive the hammer 19 downward. The lower surface of hammer 19 will strike the upper surface of tappet 51, causing tappet 51 to move downward. Due to the preload force, friction at the bit must be overcome for rotation of the tool shank to occur. This frictional resistance is transmitted through the tool shank splines 101 to the converter sleeve 69. The opposing impact force is being exerted through the tappet shoulder 66. The two forces combined with the force exerted by spring 95 squeeze the clutch disks 83 and 85 between the shoulders 66 and 78. The tappet disks 83 cannot rotate with respect to the tappet 51 because of tabs 89 and splines 67. The sleeve disks 85 cannot rotate with respect to the sleeve 69 because of the spline 79 and tabs 93. The pressure between shoulders 66 and 78 creates sufficient friction between these disks 83 and 85 so as to lock the sleeve 69 to the tappet 51 during its downward movement.

As the tappet 51 and sleeve 69 move downward, the inclined splines 81 of the sleeve 69 will move down the inclined splines 101 of tool shank 97, forcing the tool shank 97 to rotate. Just before the sleeve splines 81 reach the bottom of the tool shank splines 101, the lower end 65 of tappet 51 will strike the upper end 99 of tool shank 97. The impact will be transmitted through tool shank 97 to the work piece. Tool shank 97 is allowed to move axially a short distance to absorb shock from the impact. Rotation will stop at the time of impact of tappet 51 with tool shank 97.

Referring to FIG. 1, after impact, the continuing rotation of the hydraulic motor 13 and the cam 15 and cam followers 17 moves hammer 19 upward. Referring to FIG. 2, since there will be no force imposed on top of tappet 51, spring 95 will start moving the sleeve 69 and tappet 51 upward. There will still be a preload force imposed through carriage 21, housing 29, lower housing 43 and the thrust bearings 112 onto the tool shank 97. The lack of any downwardly acting load on the tappet 51 reduces the pressure between the shoulders 66 and 78 sufficiently so that there will be insufficient friction between the disks 83 and 85 to prevent them from rotating with respect to each other. Consequently, the tool shank 97 will remain stationary due to its preload, and the convertor sleeve 69 will rotate as splines 81 withdraw from splines 101. Disks 85 will rotate with the sleeve 69 as it moves upwardly with the tappet 51. When the tappet enlarged portion 57 reaches shoulder 41 of the housing 29, the hammer 19 (FIG. 1) will be nearing the top of its stroke, with subsequent impact being imminent.

During the operation, as the tappet 51 is moved downward from the impact of hammer 19, tappet intermediate portion 57 acts as a piston, compressing air within the housing 29. This compressed air flows through the communication passage 117 in the sleeve 69, through the check valve 115, down the passage 113 and through the bit for cleaning of the hole. During the upward movement of tappet 51, air above the intermediate portion 57 will be discharged out the passage 121, while air will be drawn in through check valve 119 into the housing 29.

During the operation, the sleeve 69 always reciprocates in unison with the tappet 51. Also, during the downstroke, the sleeve 69 is locked to the tappet 51, with the disks 83 and 85, and splines 67 and 79 serving as clutch means for locking the converter sleeve to the tappet when the tappet is moving downward. This clutch means also allows the sleeve 69 to rotate with respect to the tappet 51 as the sleeve 69 moves upward and the tool shank 97 remains stationary. Consequently, the disks 83 and 85, the converter sleeve 69 and the splines 101, serve as conversion means for converting the movement of the tappet toward the tool shank into rotation of the tool shank.

The invention shown has significant advantages. It allows a conventional, heavy duty impact tool to be operated as a rock drill, simply by changing the working tool to a rock drill attachment. The device directly converts the hammer impact into a rotary motion, without the need for any external rotational drive.

While the invention has been shown in only one of its forms, it should be apparent to those skilled in the art that it is not so limited but is susceptible to various changes and modifications without departing from the spirit thereof.

I claim:

1. In an impact tool of the type having a carriage, a hammer positioned in the carriage for axial movement with respect to the carriage, means for reciprocating the hammer, the carriage having an axial passage extending below the hammer, a rock drill attachment carried within the axial passage, comprising:
   - a housing having a cylindrical neck for reception in the axial passage, and a transverse recess formed on one sidewall of the housing that mates with a recess formed in the axial passage, defining a cavity:
   - a pin adapted to be placed in the cavity to retain the housing with the carriage;
   - a tappet carried in the housing for axial movement with respect to the housing, the tappet protruding above the neck of the housing for receiving blows from the hammer;
   - means for preventing the tappet from rotating with respect to the housing;
   - a tool shank rotatably carried in the housing for receiving blows from the tappet, the tool shank having a lower end adapted to receive a bit;
   - conversion means for converting the movement of the tappet toward the tool shank into rotation of the tool shank; and
   - spring means for moving the tappet upward after impact with the tool shank;
   - the conversion means having means for allowing the tool shank to remain stationary as the tappet is moved upward by the spring means.

2. A drilling apparatus for attachment to an impact tool of the type having a hammer reciprocally carried within a carriage:
   - a housing;
   - mounting means for mounting the housing to the carriage;
   - a tappet reciprocally carried in the housing for receiving blows from the hammer;
   - means for preventing the tappet from rotating with respect to the housing;
   - a tool shank reciprocally and rotatably carried in the housing for receiving blows from the tappet, the tool shank having an upper end containing a plurality of inclined splines and a lower end adapted to receive a bit;
   - a sleeve reciprocally carried in the housing and having an inner bore with a plurality of inclined splines that engage the inclined splines of the tool shank;
   - clutch means for locking the sleeve to the tappet when the tappet is moving downward, causing the splines of the sleeve to move down the splines of the tool shank to rotate the tool shank; and
   - spring means for moving the sleeve and the tappet upward from the tool shank after impact of the tappet with the tool shank;
   - the clutch means including means for allowing the sleeve to rotate with respect to the tappet as the sleeve moves upward.

3. A drilling attachment for an impact tool of the type having a hammer reciprocally carried within a carriage, comprising:
   - a housing adapted to be mounted to the carriage;
   - a tappet carried in the housing for receiving blows from the hammer, the tappet having a depending lower end encircled by a downwardly facing shoulder, the lower end having a plurality of vertical splines;
   - means for preventing the tappet from rotating with respect to the housing;
   - a sleeve reciprocally carried in the housing and having an upper bore and a lower bore of lesser diameter than the upper bore and divided by a upwardly facing shoulder, the upper bore having a plurality of vertical splines, the lower bore having a plurality of inclined splines;

at least one tappet disk carried between the shoulders, having an aperture for receiving the lower end of the tappet, the aperture having a plurality of tabs for engaging the vertical splines of the tappet;

at least one sleeve disk carried between the shoulders and having an aperture for receiving the tappet lower end, the sleeve disk having a periphery with a plurality of tabs for engaging the vertical splines of the sleeve, the tappet disk and sleeve disk adapted to be pressed between the shoulders during downward movement of the tappet to frictionally lock the sleeve to the tappet;

a tool shank reciprocally and rotatably carried in the housing for receiving blows from the tappet, the tool shank having a lower end adapted to receive a bit and an upper end with a plurality of inclined splines that engage the inclined splines of the sleeve for rotation of the tool shank during downward movement of the tappet; and a helical spring compressed between the housing and the sleeve for urging the sleeve upward;

the sleeve disk being adapted to rotate with respect to the tappet disk during upward movement of the tappet, when pressure between the shoulders is reduced.

* * * * *